United States Patent [19]

Blanken et al.

[11] Patent Number: 4,680,640
[45] Date of Patent: Jul. 14, 1987

[54] APPARATUS FOR REDUCING BEAM CURRENT MEASUREMENT ERRORS

[75] Inventors: Pieter G. Blanken; Pieter van der Zee, both of Eindhoven, Netherlands

[73] Assignee: U.S. Philips Corporation, New York, N.Y.

[21] Appl. No.: 833,628

[22] Filed: Feb. 27, 1986

[30] Foreign Application Priority Data

Mar. 6, 1985 [NL] Netherlands ............... 8500622
Sep. 27, 1985 [NL] Netherlands ............... 8502636

[51] Int. Cl.⁴ .................................. H04N 5/68
[52] U.S. Cl. ...................... 358/243; 358/74; 307/268; 330/257; 330/265
[58] Field of Search ............ 358/242, 243, 74, 184; 307/268, 270, 262; 330/255, 257, 260, 265, 293

[56] References Cited

U.S. PATENT DOCUMENTS

| | | | |
|---|---|---|---|
| 3,215,851 | 11/1965 | Warnock | 307/270 |
| 3,408,585 | 10/1968 | Greeson, Jr. et al. | 330/293 |
| 3,426,245 | 2/1969 | Yurasek et al. | 330/255 X |
| 3,922,614 | 11/1975 | van de Plassche | 330/257 |
| 3,997,849 | 12/1976 | Thommeu | 330/265 |
| 4,068,187 | 1/1978 | Amada et al. | 330/255 X |
| 4,072,908 | 2/1978 | Murari et al. | 330/255 X |
| 4,224,640 | 9/1980 | Hovens et al. | 358/242 |
| 4,298,886 | 11/1981 | Perkins | 358/243 X |
| 4,308,555 | 12/1981 | Hovens et al. | 358/243 |
| 4,446,443 | 5/1984 | Johnson et al. | 330/265 X |
| 4,502,079 | 2/1985 | Filliman | 358/74 X |
| 4,536,800 | 8/1985 | Parker | 358/74 X |

OTHER PUBLICATIONS

Achterberg et al, Video-Kombination TDA 3505 and TDA 3506 mit Sperrpunktregelung, 1983, pp. 1–31.

Primary Examiner—Michael A. Masinick
Assistant Examiner—E. Anne Totz
Attorney, Agent, or Firm—Thomas A. Briody; William J. Streeter; Gregory P. Gadson

[57] ABSTRACT

Errors occurring in the beam current measurement in a video output stage can be reduced by increasing the recharging rate of the capacitive load of a video amplifier, constituted by the picture display tube of a picture display arrangement, with the aid of a bias current or a quiescent current which is subtracted again from the current applied to an input of the beam current measuring circuit which is controlled by the video amplifier.

4 Claims, 2 Drawing Figures

APPARATUS FOR REDUCING BEAM CURRENT MEASUREMENT ERRORS

BACKGROUND OF THE INVENTION

The invention relates to a picture display device comprising a picture display tube, a cathode of which is coupled to the emitter of an emitter follower drivable by a video amplifier, a negative feedback signal input of the video amplifier being coupled to an input of the emitter-follower and the collector of the emitter-follower being coupled to an input of a beam current measuring circuit, while an anti-blocking circuit is coupled to the cathode of the picture display tube to prevent blocking of the beam current measuring circuit due to leakage currents in the picture display tube.

Valvo Technische Information No. 830208 discloses a picture display device of the above-described type. The base of the emitter-follower connected to the cathode of the picture display tube is controlled in said disclosure by the negatively fed-back video amplifier. The base-emitter junction of the emitter-follower is shunted by a diode having a conductivity direction which is opposite to that of the base-emitter junction of the emitter-follower. The anti-blocking circuit is constituted by a current source which applies to the emitter of the emitter-follower a current of the order of magnitude of approximately ten micro-amperes, which ensures that the leakage current of the picture display tube cannot block this emitter follower, which would render a black level beam current measurement impossible. The beam current measuring circuit produces a control signal with which the beam current of the black levels and consequently the background colour of a picture displayed by the picture display tube is kept constant to the best possible extent. It has been found that small signal-dependent variations can still occur in these black levels and, consequently, in the background colour.

SUMMARY OF THE INVENTION

The invention has for its object to prevent these variations. According to the invention, a picture display device of the type defined in the opening paragraph, is characterized in that the anti-blocking circuit is a circuit producing an emitter-follower current of the order of magnitude of at least approximately one hundred micro-amperes, while a current source is coupled to the input of the beam current measuring circuit for draining the emitter-follower current produced by the anti-blocking circuit.

These variations are caused by the capacitive loading of the emitter-follower by the cathode circuit of the picture display tube. As a result thereof, the follow rate of the signal at the emitter of the emitter-follower decreases in the region of a final value to be reached, as the current then applied to this capacitive load becomes too low. Since during black level measurements small fluctuations around a predetermined value are involved, this too low a follow rate for small signal variations is a factor to be taken into account.

By providing that the anti-blocking circuit produces a large current, a higher follow rate is obtained as a faster recharging of the capacitive load takes place, even when the signal current produced is small. It is however undesirable to have this larger current handled by the beam current measuring circuit, as the latter must be suitable for measuring variations of the order of magnitude of micro-amperes. Therefore, at the input of the beam current measuring circuit this current is subtracted again from the applied current, so that the beam current measuring circuit must substantially only handle the cathode current of the picture display tube.

In a further embodiment of a picture display device according to the invention, the what is commonly referred to as the cross-over or take-over distortion is also reduced when it is characterized in that the emitter follower forms part of a complementary emitter-follower circuit which further includes an emitter-follower which is complementary to said emitter-follower, the anti-blocking circuit is a bias voltage circuit for the bases of the emitter-followers and the current source is a current mirror circuit, an input of which is coupled to an output of a further current mirror circuit, an input of which is coupled to the collector of the complementary emitter-follower.

The bias voltage reduces the gap between the conductivity state of one emitter-follower and the conductivity state of the complementary emitter-follower to a low value, which gap occurs when the direction in which the signal varies, changes. As a result thereof the cross-over distortion decreases.

BRIEF DESCRIPTION OF THE DRAWINGS

The invention will now be described in greater detail by way of example with reference to the accompanying drawing.

In the drawing

DETAILED DESCRIPTION OF THE INVENTION

Figure 1:
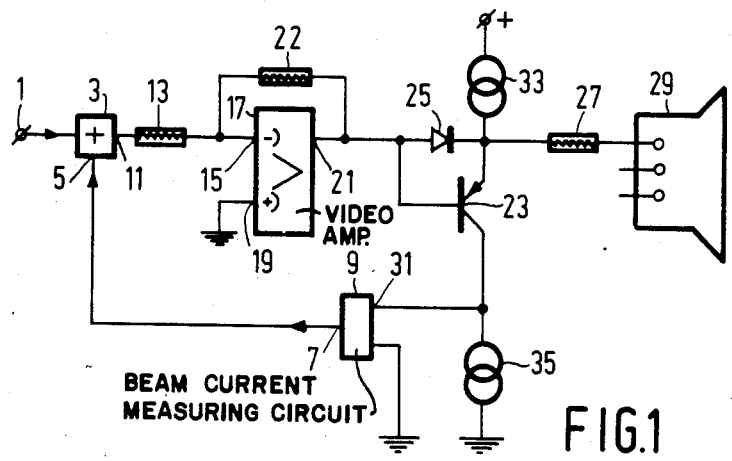
FIG. 1 illustrates by means of a concise circuit diagram a picture display device according to the invention and FIG. 2 illustrates by means of a concise circuit diagram a further possible embodiment of a picture display device according to the invention.

In FIG. 1, a video signal to be displayed is applied to an input 1 of an adder circuit 3. An input 5 of the adder circuit 3 receives from an output 7 of a beam current measuring circuit 9 a d.c. voltage level which is added to the video signal so that a video signal having a level which is controllable by the beam current measuring circuit 9 is obtained at an output 11 of the adder circuit 3.

This video signal is applied via a resistor 13 to an inverting input 15 of a video amplifier 17, a non-inverting input 19 of which is connected to ground. An output 21 of the video amplifier 17 applies an amplified video signal to the base of a transistor 23, which is arranged as an emitter-follower and whose base-emitter junction is shunted by diode 25 having a conductivity direction opposite to that of the base-emitter junction. The output 21 of the video amplifier 17 further applies a negative feedback signal to the input 15 of the video amplifier 17 via a resistor 22.

The emitter of the transistor 23 and the cathode of the diode 25 are connected to a cathode of a picture display tube 29 via a resistor 27. The collector of the transistor 23 is connected to an input 31 of the beam current measuring circuit 9. The beam current measuring circuit 9 operates, for example, in a mode as described in the above-mentioned Valvo publication Technische Information No. 830208 and supplies from its output 7 a control signal which is derived from the signal at its input 31 and keeps the black level of the relevant cathode current constant.

In addition, a current source 33 which usually serves as an anti-blocking circuit for keeping the transistor 23 in the conductuve state, even when the cathode of the picture display tube carries a leakage current in the direction from the emitter of the emitter follower 23 to the cathode, is connected to the emitter of the transistor 23. The current value customary for that purpose is of the order of magnitude of 10 micro-amperes. In this case the current source 33 produces however a significantly higher current value of the order of magnitude of approximately one hundred microamperes, which also is used for an adequately fast recharging of the capacitive load formed by the cathode of the picture display tube 29 for the emitter of the transistor 23 in the event of small signal changes, in which situation the emitter-follower 23 of the diode 25 would carry too little current. This current is now also applied to the input 31 of the beam current measuring circuit 9 via the collector of the transistor 23. This beam current measuring circuit 9 must be suitable for handling variations of not more than a few micro-amperes. It is therefore undesirable to apply the high current value in the collector circuit of the transistor 23 to the input 31 of the beam current measuring circuit 9. For that reason, connected to that input 31, there is a current source 35 which drains the current produced by the current source 33, so that the beam current measuring circuit 9 receives substantially only the cathode current of the picture display tube 29.

The current source 33 provides an improvement in the follow rate of the signal at the emitter of the emitter-follower 23 which is sufficient for small signal value changes such as they occur in a black level beam current measurement, so that the stability of this black level is improved.

At more rapid changes in the polarity of signal variations at the output 21 of the video amplifier 17, the diode 25 and the emitter junction of the transistor 23 must alternately apply a current to the capacitive load which results in a signal distortion referred to as cross-over distortion. The circuit of FIG. 2 can be used to reduce this distortion.

Figure 2:
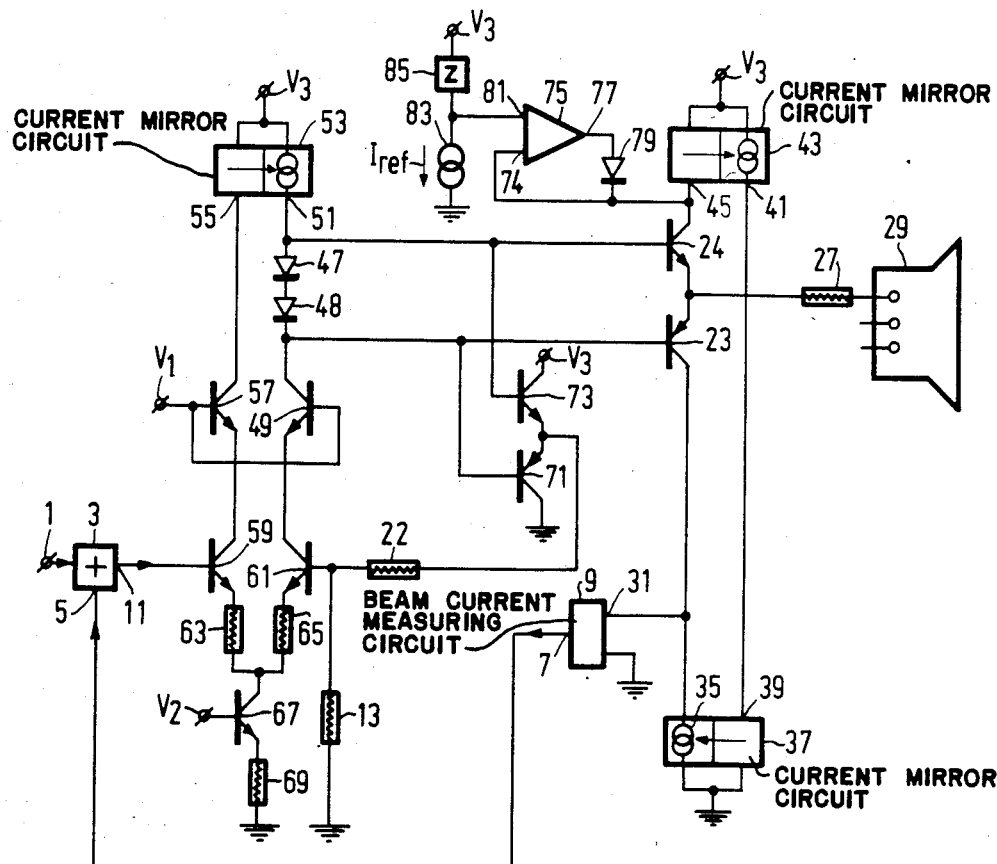

In FIG. 2 components corresponding to those in FIG. 1 are given the same reference numerals.

The diode 25 of FIG. 1 is here replaced by the base-emitter junction of a transistor 24 which, together with the transistor 23, forms a complementary emitter-follower circuit. Now the current source 35 forms part of the output circuit of a current mirror circuit 37, an input 39 of which is connected to an output 41 of a current mirror circuit 43, an input 45 of which receives the collector current from the transistor 24. If no signal variations occur, a bias voltage which produces a quiescent current of approximately one hundred microamperes through the series-arranged base-emitter junctions of the transistors 24 and 23 is present because of the presence of a bias voltage circuit formed by a series arrangement of a diode 47 and a diode 48 between the base of the transistor 24 and 23, respectively, which are connected to the anode of the diode 47 and the cathode of the diode 48, respectively. These currents then also flow in the collector circuits of these transistors. These currents are kept outside the beam current measuring circuit 9 via the current mirror circuits 43 and 37. In response to the bias voltage between the bases of the transistors 23 and 24 they now hardly produce any cross-over distortion.

The bases of the respective transistors 23 and 24 are controlled by the collector of a transistor 49; and an output 51 of a current mirror circuit 53, respectively, an input 55 of which is connected to the collector of a transistor 57. The transistors 49 and 57, which serve as a separating stage, have their bases connected to an appropriately chosen voltage $V_1$. The emitters of the transistors 57 and 49, respectively are connected to the collector of respective transistors 59 and 61. From the output 11 of the adder circuit 3 the base of the transistor 59 recieves the video signal to be displayed and a negative feedback signal is applied to the base of the transistor 61 from the junction between the resistors 22 and 13. The other terminal of the resistor 13 is connected to ground.

The emitters of the transistors 59 and 61, respectively are connected via respective resistors 63 and 65 to the collector of a transistor 67, which serves as a current source and whose emitter is connected to ground via a resistor 69 and the base to an appropriately chosen voltage $V_2$.

A signal at the input 1 produces opposite current changes at the output 51 of the current mirror circuit 53 and at the collector of the transistor 49, whereby the transistors 23 and 24 are driven.

In this case the negative feedback signal applied to the base of the transistor 61 is obtained via the resistor 22 from the interconnected emitters of a pair of complementary emitter followers 71, 73, whose collectors are connected to ground and to a suitably chosen supply voltage $V_3$, respectively, and whose bases are connected to the bases of the transistors 23 and 24. As was also the case for the transistors 23, 24, substantially no cross-over distortion occurs at the transistors 71, 73. In addition, the negative feedback eliminates the distortion at the emitter of the transistors 71, 73 so that also the signal at the bases of these transistors are substantially free from distortion and consequently also the signal at the emitters of the transistors 23, 24 will evidence little distortion.

So as to limit the dissipation in the current mirror circuits 43, 37 the current to the input 45 of the further current mirror circuit 43 can be limited by connecting said input to a negative feedback input 74 of an amplifier 75, whose ouptut 77 is connected to that negative feedback input 74 via a unidirectionally conducting element 79. The other input 81 of the amplifier 75 is connected to a reference voltage which is preferably generated by a reference current $I_{ref}$ which is produced by a current source 83 and flowing through an impedance 85 which is similar to the input impedance of the further current mirror circuit 43. In the case of an excessive current, the unidirectionally conducting element 79, a diode in the present example but which may alternatively be a base-emitter junction of a transistor, forms a negative feedback signal path keeping the current to the input 45 of the further current mirror circuit 43 constant at a value determined by the reference current $I_{ref}$. p If so desired, the transistors in the circuits may be of the unipolar type. In that case the word emitter must be replaced by source, base by gate and collector by drain.

What is claimed is:

1. A picture display device comprising a picture display tube a cathode of which is coupled to the emitter of an emitter-follower drivable by a video amplifier, a negative feedback signal input of the video amplifier being coupled to an input of the emitter-follower and the collector of the emitter-follower being coupled to an input of a beam current measuring circuit, while an anti-blocking circuit is coupled to the cathode of the picture display tube to prevent blocking of the beam current measuring circuit due to leakage currents in the picture display tube, characterized in that the anti-blocking circuit is a circuit producing an emitter-follower current of the order of magnitude of at least approximately one hundred micro-amperes, while a current source is coupled to the input of the beam current measuring ciruit for draining the emitter-follower current produced by the anti-blocking circuit.

2. A picture display device as claimed in claim 1, characterized in that the emitter-follower forms part of a complementary emitter-follower circuit which includes a further emitter-follower which is complementary to said emitter-follower, a bias voltage circuit means coupled to the bases of the emitter-followers and the current source is a current mirror circuit an input of which is coupled to an output of a further current mirror circuit an input of which is coupled to the collector of the complementary emitter-follower.

3. A picture display device as claimed in claim 2, characterized in that the input of a negative feedback circuit is coupled to an output of a preamplifier-controllable complementary emitter-follower circuit including said bias voltage circuit means for the bases thereof.

4. A picture display device as claimed in claim 2 or 3, characterized in that the input of the further current mirror circuit is connected to a second negative feedback circuit of an amplifier whose output is connected via a unidirectionally conducting element to the second negative feedback circuit and a further input of said amplifier to a junction between a current source and an impedance which is similar to an input impedance of the further current mirror circuit.

* * * * *

UNITED STATES PATENT AND TRADEMARK OFFICE
CERTIFICATE OF CORRECTION

PATENT NO. : 4.680.640

DATED : July 14. 1987

INVENTOR(S) : Pieter G. Blanken. et al

It is certified that error appears in the above-identified patent and that said Letters Patent is hereby corrected as shown below:

IN THE CLAIMS

Claim 2, line 10    Change "complementary" to

--further--

Signed and Sealed this

Twenty-ninth Day of November, 1988

*Attest:*

DONALD J. QUIGG

*Attesting Officer*    *Commissioner of Patents and Trademarks*